Figure 1:
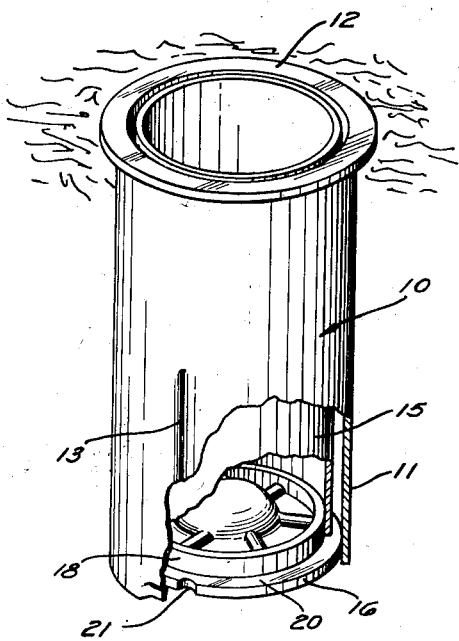

May 21, 1957 — C. A. WALOUKE — 2,792,960
GROUND INSERTED VASES
Filed July 26, 1954

INVENTOR.
CHARLES A. WALOUKE
BY
ATTORNEY

United States Patent Office 2,792,960
Patented May 21, 1957

2,792,960

GROUND INSERTED VASES

Charles A. Walouke, Cleveland, Ohio

Application July 26, 1954, Serial No. 445,861

4 Claims. (Cl. 220—18)

This invention relates to a ground inserted vase, and more particularly to a ground vase including an outer casing adapted to be inserted into the earth substantially flush with the sod and arranged to receive a receptacle for the display of cut flowers in cemeteries, nurseries and the like.

It is among the objects of this invention to provide a cemetery bouquet holder that may be used the year around, in freezing weather or otherwise, by embodying therein means for alleviating the extremely high pressure upon the walls of the vase by reason of water freezing therein.

Another object of the invention is to provide a bouquet holder that may be permanently inserted into the earth, having its top surface substantially flush with the sod, thereby permitting a lawn mower and the like to pass freely thereover, and the desirable feature of blending in with the surrounding landscape in cemeteries where the use of above-the-ground receptacles, vases and the like are not permitted.

A further object of this invention is to provide a cemetery bouquet holder of such unique design and durable construction that it may be inserted in the ground and left therein the year round without any appreciable deterioration, corrosion or damage to the bouquet holder.

A still further object of this invention is to provide a bouquet holder that, when it is not in use containing cut flowers, may be closed to the elements, such as rain, merely by inverting the internal container member, thereby preventing the accumulation of stagnant water or the like.

Figure 2:
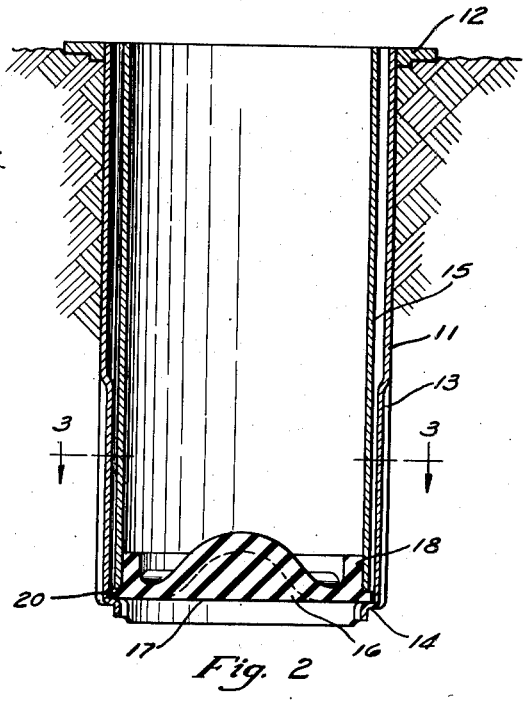
Figure 5:
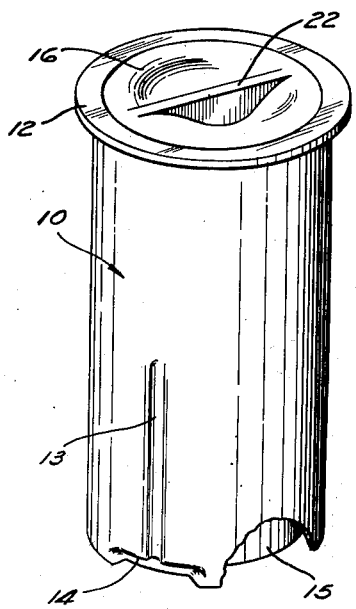
Figure 3:
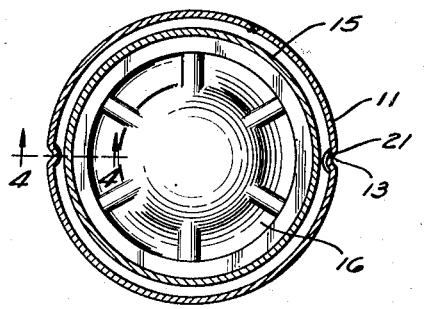
Figure 4:
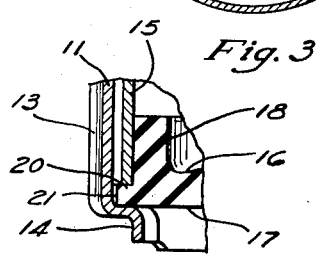

Various other objects and advantageous features of the invention not at this time more particularly pointed out will become more apparent as the nature of the invention is better understood from the following detailed description taken in conjunction with the accompanying drawing wherein like reference characters denote corresponding parts and wherein:

Figure 1 is a perspective view of my invention shown inserted into the ground with parts thereof broken away and shown in section, Figure 2 is a vertical medial sectional view of the vase illustrated in Figure 1, Figure 3 is a transverse sectional view taken substantially along the line 3—3 of Figure 2, Figure 4 is an enlarged fragmentary sectional detail view taken substantially along the line 4—4 of Figure 3, Figure 5 is a perspective view of the vase of my invention with the inner flower receiving receptacle in inverted position, and having a portion of the outer shell member thereof broken away.

With reference to the accompanying drawings there is illustrated a cemetery bouquet holder constructed in accordance with the invention generally indicated by the numeral 10. The vase 10 comprises a tubular outer casing member 11 having both ends open, one of which is provided with an outwardly extending flange formed by securing to the outer casing wall an annular ring member 12. As clearly shown in Figure 2, the ring member 12 serves the function of positioning the bouquet holder and particularly casing 11 substantially flush with the surrounding sod when inserted into a hole dug into the ground, thereby permitting the wheels of a lawn mower or other device to readily pass thereover.

The inner wall of the casing 11 is provided with vertically disposed inwardly extending ribs 13 which terminate at their lower ends in an inwardly crimped edge portion of the lower end of the casing wall which forms supporting ledges, the purpose of which will be apparent hereinafter.

The vase, or inner shell 15, is formed of a piece of cylindrical tubing with both ends open and is of a heavy wall thickness to resist deterioration and of a height so as to be substantialy level with the top surface of outer casing 11 and flange member 12 thereon when assembled in conjunction with closure member 16 and seated on flanges 14 of casing 11 as clearly shown in Figure 2.

The closure member 16 is preferably made of a semi-hard rubber material having a bottom surface 17 of slightly greater diameter than the outside diameter of the inner shell 15. The side wall 18 of the closure member 16 is recessed inwardly so that the outside diameter thereof is slightly greater than the inside diameter of the shell 15 so that when the side wall portion of the closure member is compressed and inserted into the end of the shell a water tight seal between the two members is effected. To further effect a seal the end of the shell seats on the shoulder 20 formed by the offset in the side wall 18. The shell 15 with its assembled closure member when positioned within the outer casing 11 is supported on the ledges 14 thereby limiting the downward movement of the shell 15 and maintaining the top edge substantially level with the ring member 12 and casing 11.

Closure member 16 being preferably made of a semi-hard rubber material is of a configuration that will allow said member to deform or be pushed downwardly from shell 15 when subjected to pressure by reason of water freezing within the shell, thereby preventing damage to the shell as well as outer casing member. The shoulder 20 of closure member 16 is provided with diametrically opposite recessed areas 21 that when positioned in respect to formed ribs 13 serve as a guide when raising or lowering the inner shell 15 from the outer casing 11. The closure member 16 is also designed and formed to provide a handle 22 for use when the inner shell is in an inverted position as shown in Figure 5.

Having thus described my invention so that those skilled in the art may practice the same, what I desire to obtain by Letters Patent is defined in the appended claims.

I claim:

1. A receptacle of the type described suitable to be permanently inserted in the ground, comprising a substantially cylindrical open end casing having one end formed with an outwardly extending flange and having the wall thereof adjacent the opposite end inwardly crimped to form inwardly extending projections, an open end cylindrical member slidably mounted in said casing and a flexible closure member inserted into one end of the cylindrical member to form a receptacle for receiving and holding floral decorations therein, said inwardly extending projections serving to limit the longitudinal movement of the cylindrical member within the casing.

2. A receptacle of the type described suitable to be permanently inserted in the ground, comprising a substantially cylindrical open end casing having one end formed with an outwardly extending flange and having the wall thereof adjacent the opposite end inwardly crimped to form inwardly extending projections, an open end cylindrical member slidably mounted in said casing, said projections serving to guide the cylindrical member within the casing, a removable closure member frictionally engaging within one end of the cylindrical member to form a receptacle for receiving and holding floral decorations, said closure member adapted to be readily ejected from the end of the cylindrical member under internal pressure caused by water freezing within the said member and inwardly crimped wall portions positioned adjacent the lower end of the casing for limiting the downward movement of the cylindrical member within the casing.

3. A receptacle of the type described suitable to be permanently inserted in the ground, comprising a substantially cylindrical open end casing, an open end cylindrical member mounted in said casing and a flexible closure member frictionally engaging within one end of the cylindrical member to form a receptacle for receiving and holding floral decorations, inwardly crimped wall portions positioned adjacent the lower end of the casing for limiting the downward movement of the cylindrical member within the casing, said flexible closure member being so held within the end of the cylindrical member as to be deformed and ejected therefrom under internal pressure caused by water freezing within the said member.

4. A cemetery vase including a cylindrical casing having open ends and adapted to be imbedded in the ground, an inner cylindrical receptacle slidable vertically in said casing, means formed on the inner wall portion of the casing for limiting the downward movement of the cylindrical receptacle within the casing, said receptacle having a rubber closure member frictionally held within one end of the receptacle and adapted to be deformed in response to pressure caused by water freezing within the receptacle thereby preventing rupture of the walls of the cylindrical member.

References Cited in the file of this patent
UNITED STATES PATENTS

| | | |
|---|---|---|
| 1,784,621 | Boyer | Dec. 9, 1930 |
| 1,785,859 | Escher | Dec. 23, 1930 |
| 1,814,141 | Fox et al. | July 14, 1931 |
| 2,585,923 | Epler et al. | Feb. 19, 1952 |
| 2,634,014 | Kimber | Apr. 17, 1953 |
| 2,649,245 | Silverstolpe | Aug. 18, 1953 |
| 2,655,280 | Cuttell et al. | Oct. 17, 1953 |